UNITED STATES PATENT OFFICE.

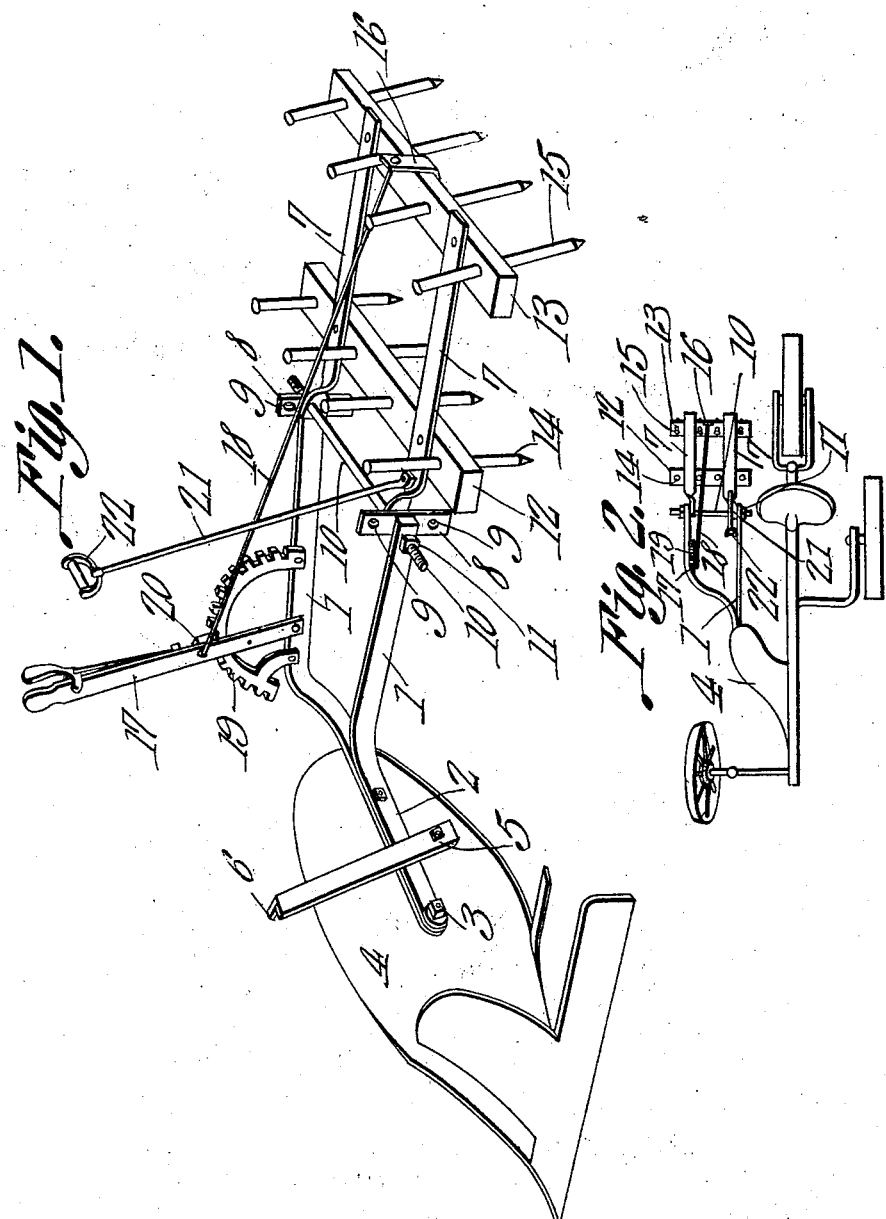

HERMAN OGLE, OF NEWTON, KANSAS.

HARROW ATTACHMENT FOR PLOWS.

968,072.         Specification of Letters Patent.     Patented Aug. 23, 1910.

Application filed May 12, 1910. Serial No. 560,961.

*To all whom it may concern:*

Be it known that I, HERMAN OGLE, a citizen of the United States, residing at Newton, in the county of Harvey and State of Kansas, have invented a new and useful Harrow Attachment for Plows, of which the following is a specification.

This invention relates to a harrow attachment for plows and consists in the novel construction and arrangement of its parts as hereinafter shown and described.

The object of the invention is to provide a simple and an effective attachment adapted to be applied to the mold board of a furrow opener with various means for adjusting its several parts to cause the teeth carried by the attachment to effectually pulverize and scuffle the soil.

With this object in view the structure includes a frame adapted to be pivotally connected with the rear side of the mold board of a furrow opener; a guide being provided upon the said mold board to restrain the pivotal movement of the said frame to a vertical direction only. Arms are adjustably connected with the said frame and means are provided upon the frame for holding the arms in adjusted position. Bars carrying the teeth are attached to the arms and means are provided whereby the said attachment may be manually swung upon pivotal connection with the mold board of the furrow opener.

In the accompanying drawings, Figure 1 is a perspective view of the harrow attachment applied to the mold board of a furrow opener. Fig. 2 is a top plan view illustrating diagrammatically the relative position of the harrow attachment to the furrow opener and the frame of the plow.

The attachment consists of a frame 1 which is provided at its forward portion with a projecting corner portion 2 which is pivoted at the point 3 to the rear side of a mold board 4 of a furrow opener. A guide strip 6 is fixed at its lower portion to the mold board 4 of the furrow opener and is provided at its upper end with a latch 6 which is disposed in the path of movement of the portion 2 of the frame 1.

Arms 7 are provided at their forward ends with vertically disposed plates 8 each carrying a series of perforations 9. A transversely disposed rod 10 is located at the rear end of the frame 1 and passes through a perforation 9 in each of the plates 8. Clamping nuts 11 are screw threaded upon the end portions of the rod 10 and serve to hold the rod against longitudinal movement with relation to the frame 1. Bars 12 and 13 are attached to the arms 7 and spaced from each other, the bar 12 carries harrow teeth 14 which are vertically disposed with relation to the arms 7 and the bar 13 is provided with harrow teeth 15 which at their lower pointed ends are rearwardly inclined with relation to the arms 7. A lug 16 is mounted upon the intermediate portion of the bar 13 and a lever 17 is fulcrumed upon the frame 1. A connecting rod 18 operatively connects the lever 17 with the lug 16 and a gear segment 19 is mounted upon the frame 1 and is adapted to be engaged by a spring pawl 20 carried by the lever 17. A rod 21 is secured at its lower end to one of the arms 7 and is provided at its upper end with a handle grip 22 which is adapted to be located within reach of an operator riding upon the frame of the plow to which the furrow opener carrying the mold board 4 is attached. As the frame of the plow forms no part of the present invention it is thought further allusion to the same is unnecessary in this specification.

By this arrangement and assemblage of parts it will be seen that as the furrow opener turns a furrow slice the said material is cast by the mold board 4 in advance of the harrow attachment and the teeth 14 and 15 of the said attachment will engage the soil immediately after it is turned and pulverize and scuffle the same leaving the soil in condition for planting. If at any time the teeth 14 and 15 should accumulate trash an operator grasps the grip 22 and pulls on the rod 21 which lifts the teeth 14 and 15 and thus the trash collected by the same may be liberated. When the attachment is lifted as above indicated the latch 6 extending into the path of movement of the portion 2 of the frame 1 will limit the upward swinging movement of the said attachment. By reason of the fact that the plates 8 are provided with a number of perforations 9 means are provided for adjustably connecting the forward ends of the arms 7 with the rear end portion of the frame 1. Thus the said arms 7 and bars 13 and 14 may be so positioned as to cause the teeth 14 and 15 to operate below the surface of the soil to any desired extent. By reason of the fact that the forward ends of the arms 7 are pivotally connected with the rod 10 and the rear bar 13 is operatively connected with the lever 17 by means of a rod 18 and lug 16 it will be seen that by swinging said lever 17 the arms 7 may be swung upon their connection with the rod 10 so as to assume any desired angle with relation to a horizontal. Thus the teeth 14 and 15 may be presented to the soil in any desired angle as occasion or conditions may require.

Having thus described the invention, what I claim as new and desire to secure by Letters-Patent is:

A harrow attachment comprising a frame having at its forward portion an extension for pivotal attachment to a support, arms pivotally and adjustably secured to the rear portion of the frame, bars carried by the arms, harrow teeth carried by the bars, and a lever mechanism mounted upon the frame and operatively connected with the rear end portions of the said arms to swing the same and a lifting handle connected with the attachment.

In testimony that I claim the foregoing as my own, I have hereto affixed my signature in the presence of two witnesses.

HERMAN OGLE.

Witnesses:
J. S. HENDERSON,
L. G. HARLAN.